US011522690B2

(12) United States Patent
Detres et al.

(10) Patent No.: US 11,522,690 B2
(45) Date of Patent: Dec. 6, 2022

(54) SUPPLY CHAIN MANAGEMENT SYSTEM

(71) Applicant: Volum Holdings, OÜ, Tallinn (EE)

(72) Inventors: Arnaldo A. Detres, West Palm Beach, FL (US); Alonzo Pierce, Houston, TX (US)

(73) Assignee: Bengala Technologies, LLC, West Palm Beach, FL (US)

( * ) Notice: Subject to any disclaimer, the term of this patent is extended or adjusted under 35 U.S.C. 154(b) by 554 days.

(21) Appl. No.: 16/434,540

(22) Filed: Jun. 7, 2019

(65) Prior Publication Data

US 2020/0389301 A1    Dec. 10, 2020

(51) Int. Cl.
| | |
|---|---|
| H04L 9/08 | (2006.01) |
| G06Q 20/38 | (2012.01) |
| G06F 16/182 | (2019.01) |
| H04L 9/06 | (2006.01) |
| G06F 9/455 | (2018.01) |
| H04L 9/00 | (2022.01) |

(52) U.S. Cl.
CPC ........ H04L 9/0861 (2013.01); G06F 9/45558 (2013.01); G06F 16/1824 (2019.01); G06Q 20/3825 (2013.01); H04L 9/0643 (2013.01); G06F 2009/45595 (2013.01); H04L 9/50 (2022.05)

(58) Field of Classification Search
CPC ........... G06Q 20/3678; G06Q 20/0658; G06Q 20/3676; G06Q 20/381; G06Q 20/3223; G06Q 20/3825; G06Q 20/065; G06Q 30/0207; G06Q 40/08; G06Q 20/223; G06Q 40/04; H04L 9/0637; H04L 9/0861; H04L 9/0643; H04L 2209/38; H04L 9/3239; G06F 9/45558; G06F 16/1824; G06F 2009/45595; G06F 16/9024; G06F 2009/45587
See application file for complete search history.

(56) References Cited

U.S. PATENT DOCUMENTS

| | | | |
|---|---|---|---|
| 2008/0306783 A1* | 12/2008 | Yee | G06Q 10/04 705/7.26 |
| 2018/0197172 A1* | 7/2018 | Coburn | A63F 13/792 |
| 2019/0095880 A1* | 3/2019 | Glover | G06F 16/1805 |
| 2019/0180291 A1* | 6/2019 | Schmeling | G16H 20/10 |

(Continued)

*Primary Examiner* — Abu S Sholeman
(74) *Attorney, Agent, or Firm* — Patentfile, LLC; Bradley C. Fach; Steven R. Kick

(57) ABSTRACT

An integrated supply platform system may include a blockchain database maintained by a blockchain network having a plurality of nodes. A plurality of tokens may be maintained in the blockchain database. The system may include smart contracts describing a deal between one or more users, and the smart contracts may be configured to transfer at least one token between the users upon completion of the deal. The system may include communication logic which may be executable by a processor of a client device and configured to communicate data of the smart contract between the client device and the blockchain database. A virtual machine logic may be stored in a memory of a node of the blockchain network. The virtual machine logic may be executable by a processor of the node of the blockchain network and configured to incorporate the data of the smart contract into the blockchain database.

16 Claims, 11 Drawing Sheets

(56) References Cited

U.S. PATENT DOCUMENTS

| | | | | |
|---|---|---|---|---|
| 2019/0342085 A1* | 11/2019 | Kube | ............... | H04L 9/3239 |
| 2019/0347725 A1* | 11/2019 | de Jong | ............... | G06Q 20/065 |
| 2019/0385156 A1* | 12/2019 | Liu | ............... | G06Q 20/381 |
| 2020/0027067 A1* | 1/2020 | Hertzog | ............... | G06Q 20/10 |
| 2020/0053081 A1* | 2/2020 | Park | ............... | H04L 9/321 |
| 2020/0202311 A1* | 6/2020 | Allen | ............... | G06Q 20/065 |
| 2020/0320043 A1* | 10/2020 | Sen | ............... | G06F 16/1824 |
| 2021/0281421 A1* | 9/2021 | Semenovskiy | ............... | H04L 9/3247 |

\* cited by examiner

SUPPLY CHAIN MANAGEMENT SYSTEM

FIELD OF THE INVENTION

This patent specification relates to the field of supply chain platforms. More particularly, the present patent specification relates to a supply platform using an integrated blockchain and utility tokens.

BACKGROUND

Holding companies have been a part of the business and investing landscape for many decades. Some of the most well-known companies in the world, including Alphabet (Google), Berkshire Hathaway, General Electric and Bank of America are operated as holding companies. Benefits of a holding company structure include the minimization of risks through diversification, and allows shared infrastructure to quickly attain economies of scale. However, holding companies currently lack access to a supply platform in which all portfolio companies leverage a common native currency and blockchain technology platform that enables streamlined supply chain management, B2B marketplace transactions supported by trustless smart contracts and advanced data analytics. Therefore, a need exists for novel computer-implemented systems and methods for a supply platform using an integrated blockchain and utility tokens which will allow portfolio companies to benefit from vertical and horizontal integration opportunities with other operating companies.

BRIEF SUMMARY OF THE INVENTION

An integrated supply platform system is provided which companies and users greater organizational and oversight capabilities than they have ever had before. In preferred embodiments, users can Track, Route, Identify, and Source, all the data activity that happens on their supply chains via the system. Data of the system may be locked into one or more blockchain databases of the system which can be trusted and verified at any point during operations.

In some embodiments, an integrated supply platform system may include a blockchain database maintained by a blockchain network, and the blockchain network may have a plurality of nodes. A plurality of tokens may be maintained in the blockchain database. The system may include one or more smart contracts describing a deal between one or more users, and the smart contracts may be configured to transfer at least one token between the users upon completion of the deal. A communication logic may be stored in the memory of a client device. The communication logic may be executable by a processor of the client device and configured to communicate data of the smart contract between the client device and the blockchain database. A virtual machine logic may be stored in a memory of a node of the blockchain network. The virtual machine logic may be executable by a processor of the node of the blockchain network and configured to incorporate the data of the smart contract into the blockchain database.

In further embodiments, the plurality of tokens of the system may include at least one ERC721 token and/or at least one ERC20 token. More preferably, the system may include a plurality of ERC721 tokens and ERC20 tokens.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
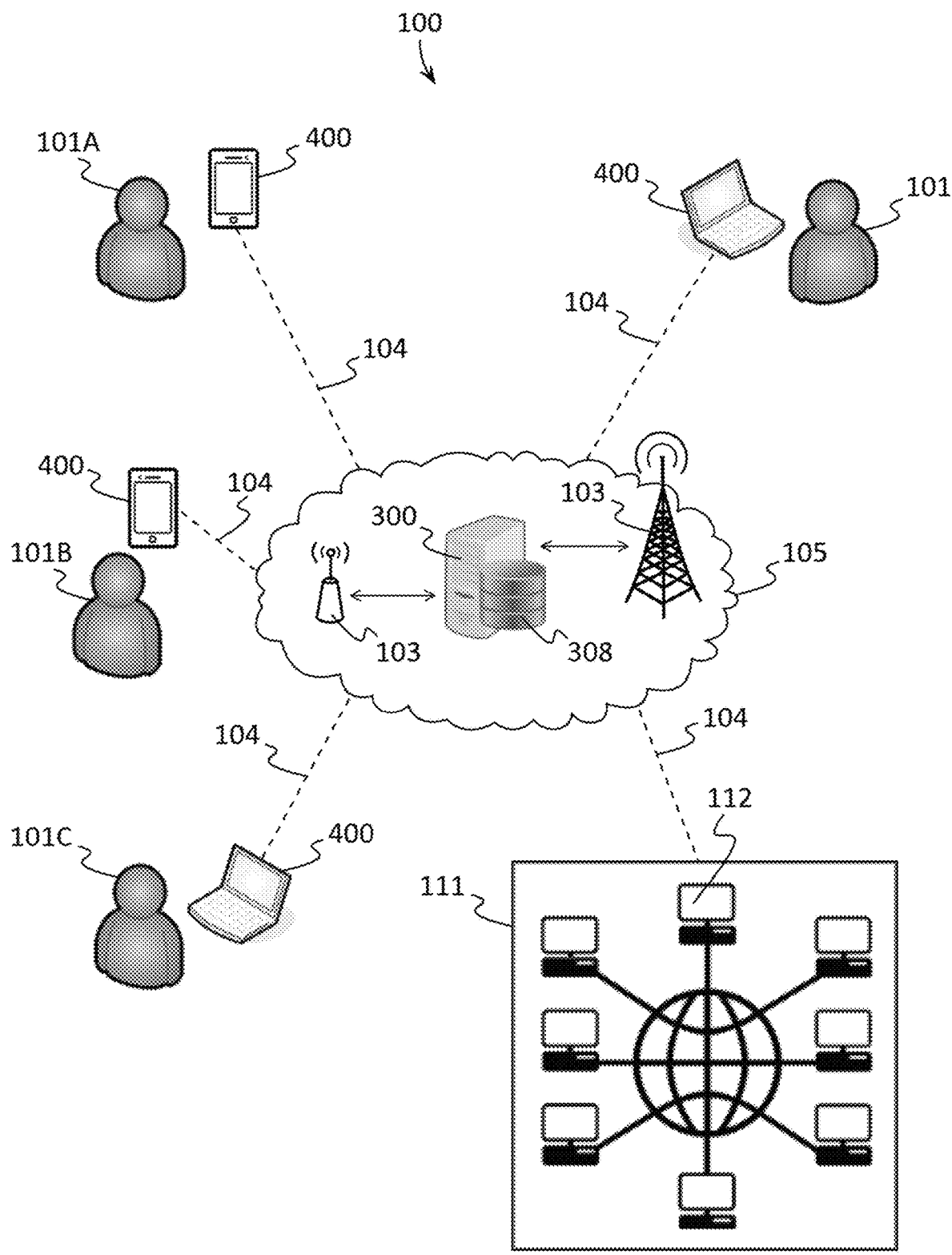
FIG. 1 depicts an illustrative example of some of the components and computer implemented methods which may be found in an integrated supply platform system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code", "source code", "script", or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, servers, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, servers, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

Client devices may include any type of "smart device", and as used herein, a smart device refers to any electronic device, generally connected to other devices or networks via different wireless protocols such as Bluetooth, NFC, WiFi, 3G, etc., that can operate to some extent interactively and autonomously. Smart devices may operate via the Internet of things (IoT) is the extension of Internet connectivity into physical devices and everyday objects. Several notable types of smart devices include smartphones (like the Apple iPhone or most of the devices running Android operating system), phablets and tablets (like the Apple iPad or Google Nexus 7), smartwatches, smart bands and smart keychains (as Prestigio Keys), Nest thermostat, Ring doorbell, August Home smart lock, and any other electronic device which may have internet or network connectivity and one or more sensors. The term can also refer to a ubiquitous computing device: a device that exhibits some properties of ubiquitous computing including—although not necessarily—artificial intelligence. Additionally, smart device may refer to electronic devices which may be used for home automation systems which use computer and information technology to control home appliances and features (such as windows or lighting). Smart devices can range from simple remote controls of lighting through to complex computer/microcontroller based networks with varying degrees of intelligence and automation. Several notable types of smart devices include remotely operated locks, smart appliances such as smart washing machines, smart dryers, smart storage (wardrobes, drawers, etc.), smart light bulbs and lighting, smart thermostats, security systems and cameras, intercoms, domotics, smart shading, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigby network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

As used herein, the term "blockchain" shall generally mean a distributed database that maintains a continuously growing ledger or list of records, called blocks, secured from tampering and revision using hashes. Every time data may be published to a blockchain database the data may be published as a new block. Each block may include a timestamp and a link to a previous block. Through the use of a peer-to-peer network and a distributed timestamping server, a blockchain database is managed autonomously. Blockchains are an open, distributed ledger that can record transactions between two parties efficiently and in a verifiable and permanent way. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction input results in a different hash value being computed, which indicates potentially compromised transaction input. Digital signatures ensure that transactions originated from senders (signed with private keys) and not imposters. This covers different approaches to the processing including hash trees and hash graphs. At its core, a blockchain system records the chronological order of transactions with all nodes agreeing to the validity of transactions using the chosen consensus model. The result is transactions that are irreversible and agreed to by all members in the network.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented integrated supply platform systems and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise an integrated supply platform system ("the system") 100 according to some embodiments is presented. The system 100 is configured to facilitate the transfer of data and information between one or more access points 103, client devices 400, and servers 300 over a data network 105. Each client device 400 may send data to and receive data from the data network 105 through a network connection 104 with an access point 103. A data store 308 accessible by the server 300 may contain one or more databases. The data may comprise any information pertinent to supply chains and their management which one or more users 101 and client devices 400 may input into the system 100, including information on or describing one or more users 101, information on or describing one or more Payments, Rewards, Purchase Orders, Legal Contracts, Regulatory Compliance, Taxation, Shipment Management, Letters of Origin, Customs Documents, Inputs/Outputs and Inventory Ordering, Delivery/Parcel Tracking, IoT Monitoring and Reporting, Big Data Analytics, Inputs and End-Product Tracking/Traceability, and other business to business operations between one or more users 101.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, smart devices, and the like, that are equipped with a wireless network interface capable of sending data to one or more servers 300 with access to one or more data stores 308 over a network 105, such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

In some embodiments, the system 100 may be configured to facilitate the communication of information to and from one or more users 101, through their respective client devices 400 and servers 300 of the system 100. Users 101 of the system 100 may include one or more individuals acting as or on behalf of one or more holding companies 101A, portfolio companies 101B, such as merchant users, and government/regulatory users 101C. Additionally, a user 101 may include a consumer or customer, delivery personnel, transportation and warehousing personnel, or any other entity involved in a supply chain 140 and its management.

Generally, a holding company 101A may be a parent corporation, limited liability company, or limited partnership that owns enough voting stock or equity in another company, such as a portfolio company 101B, that it can control and/or influence that company's policies and oversee its management decisions. Although a holding company 101A owns one or more assets of other companies, typically it merely maintains oversight capacities and therefore does not actively participate in running a business' day-to-day operations.

A portfolio company 101B may be a company or entity in which a holding company 101A invests. In preferred embodiments, the system 100 may be used to exchange data between a holding company 101A and its one or more portfolio companies 101B. example portfolio companies may include manufacturers, bottlers, distillers, distributors, brand incubators and creators of Alcoholic beverages or any other good or service. Using the system 100, portfolio companies 101B can exchange, view, upload, download, notarize, register, validate, approve and disapprove data regarding contracts, purchases, register of raw goods, tracking and tracing of products and materials, identification of products, trade assurance of products, letter of intentions, Certificate of Origin, purchase orders, paperwork regarding specific processes in different parts of the business, delivery, liquids registration and of course payment.

A government/regulatory user 101C may include a government agency or individual acting on its behalf, a regulatory agency or individual acting on its behalf, or any other entity which may be involved with taxation, regulatory compliance, auditing, or any other oversight function. In preferred embodiments, one or more government/regulatory user 101C may have access to the system 100, from where they will be able to streamline their processes that they are required to carry out such as licensing, process tracking, Colas, Certificate of Origins, Registration of Brands, Permits tracking and verification of licenses and vetted status. A government/regulatory user 101C may include Customs and Border patrol entities which may have access to the system 100 so as to have regulatory access to importation and exportation documents, certificate of origin and their respective processes. A government/regulatory user 101C may include Internal Revenue Service and other taxation and fee collecting entities which may have access to the system 100 in order to verify company's income production, and be able to receive instant payments for their respected tax schedules depending on the rate per transaction. Furthermore, government/regulatory users 101C may include various regulatory agencies to provide legal advice and process information.

In some embodiments, the system 100 may include a blockchain network 111, having one or more nodes 112, which may be in communication with one or more servers 300 client devices 400 of the system 100. A node 112 may be a server 300, a client device 400, or any other suitable networked computing platform. The blockchain network 111 may manage a distributed blockchain database 113 containing data recorded by the one or more client devices 400 of the system 100. The data recorded by the one or more client devices 400 may be maintained as a continuously growing ledger or listing of the data recorded by the one or more client devices 400, which may be referred to as blocks, secured from tampering and revision. Each block includes a timestamp and a link to a previous block. Through the use of a peer-to-peer blockchain network 111 and a distributed timestamping server 300, a blockchain database 113 may be managed autonomously. Consensus between nodes 112 ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input. Digital signatures ensure that data entry transactions (data added to the blockchain database 113) originated from senders (signed with private keys) and not imposters. At its core, a blockchain database 113 may record the chronological order of data entry transactions with all nodes 112 agreeing to the validity of entry transactions using the chosen consensus model. The result is data entry transactions that are irreversible and agreed to by all members in the blockchain network 111.

The blockchain network 111 may comprise a cryptocurrency or digital asset designed to work as a medium of exchange that uses cryptography to secure its transactions, to control the creation of additional units, and to verify the transfer of assets. Example cryptocurrencies include Bitcoin, Ether, Ripple, etc. The blockchain network 111 may also comprise tokens common to cryptocurrency based blockchain networks 111. The tokens may serve as a reward or incentive to nodes 112 for blockchain network 111 services and to make the blockchain network 111 attach resistant. The blockchain network 111 may comprise token governance rulesets based on crypto economic incentive mechanisms that determine under which circumstances blockchain network 111 transactions are validated and new blocks are created. Tokens may include usage tokens, utility tokens, work tokens, behavioral tokens, Intrinsic, Native or Built-in tokens, application token, asset-backed tokens, or any other type of token which may be used in a cryptocurrency network.

In preferred embodiments, the system 100 may be built on the Ethereum blockchain. Ethereum is an open-source, public, blockchain-based distributed computing platform and operating system featuring smart contract functionality. In further preferred embodiments, the system may utilize ERC20 tokens 120 and ERC721 tokens 121. ERC-20 is a technical standard used for self-executing smart contracts on the Ethereum blockchain for use on fungible tokens. The clear majority of tokens issued on the Ethereum blockchain are ERC-20 compliant. Each ERC20 token 120 is the same as any another ERC20 token 120. Some tokens will need to be specifically unique and non-fungible. The protocol for enabling these types of tokens is ERC721. This type of token is used to certify authenticity, validate rarity and to further ensure immutability to prevent unauthorized copies. Each ERC721 token 121 is unique from any other token. It should be understood that the system 100 and methods described herein are not limited to the Ethereum blockchain, and that any other suitable blockchain may be used.

Figure 2:
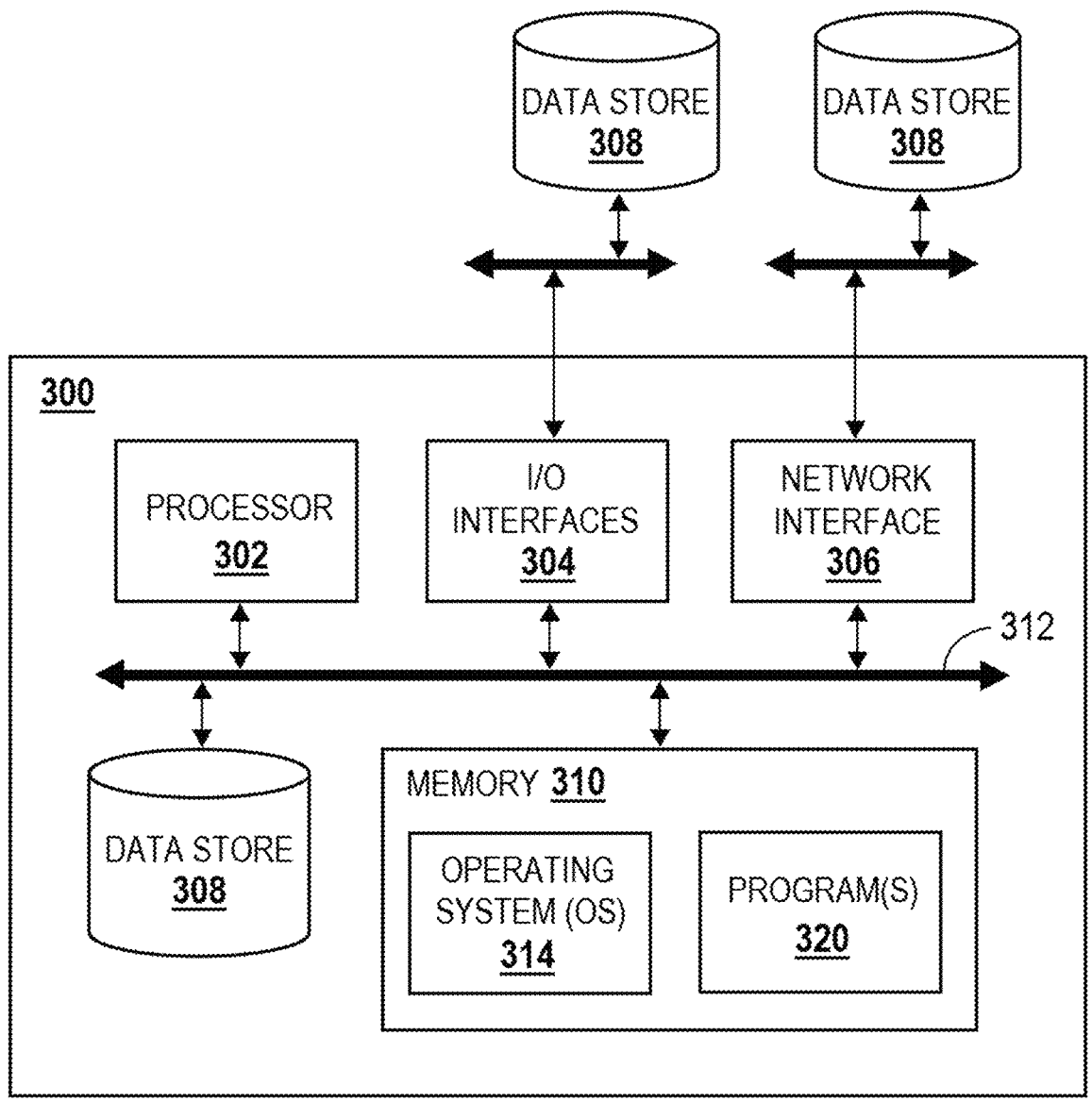
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008/2012/2016 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 3:
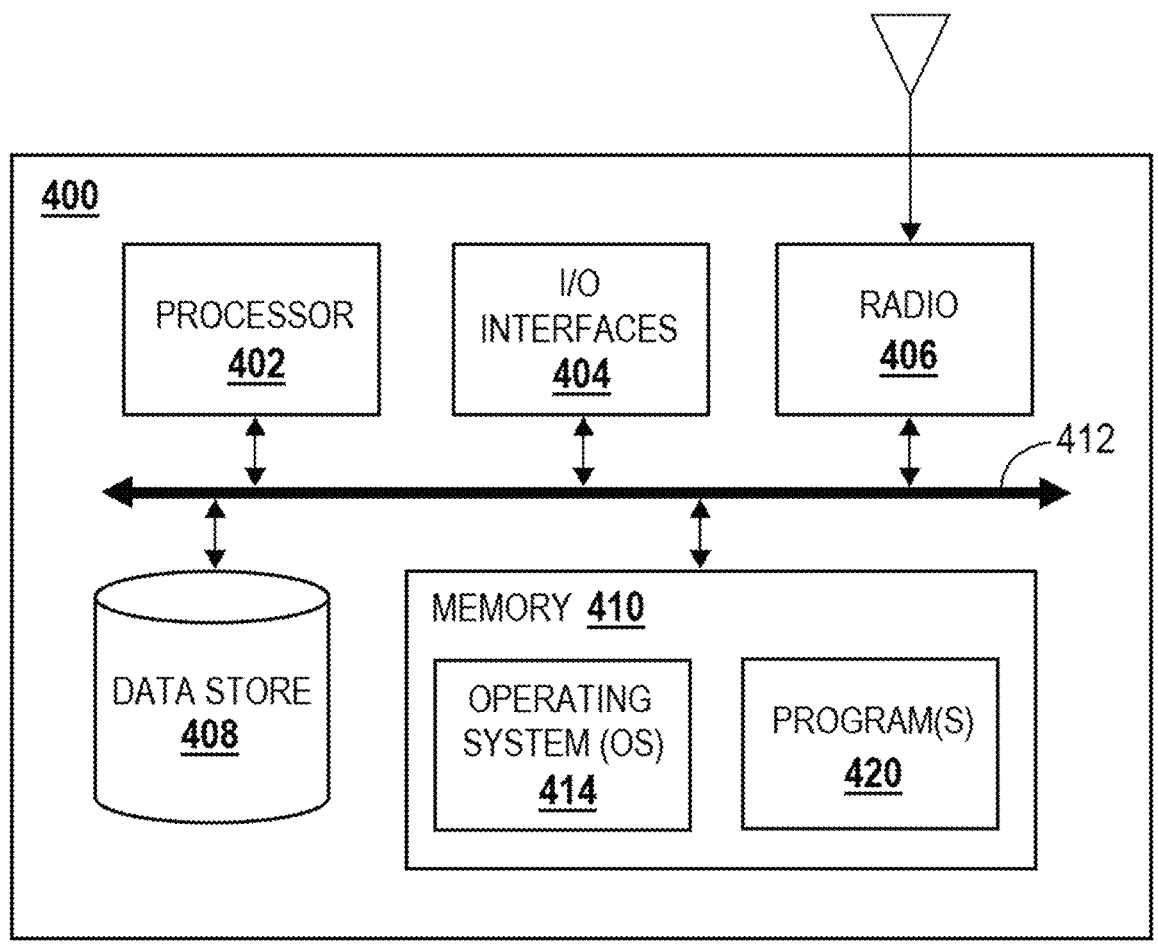
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
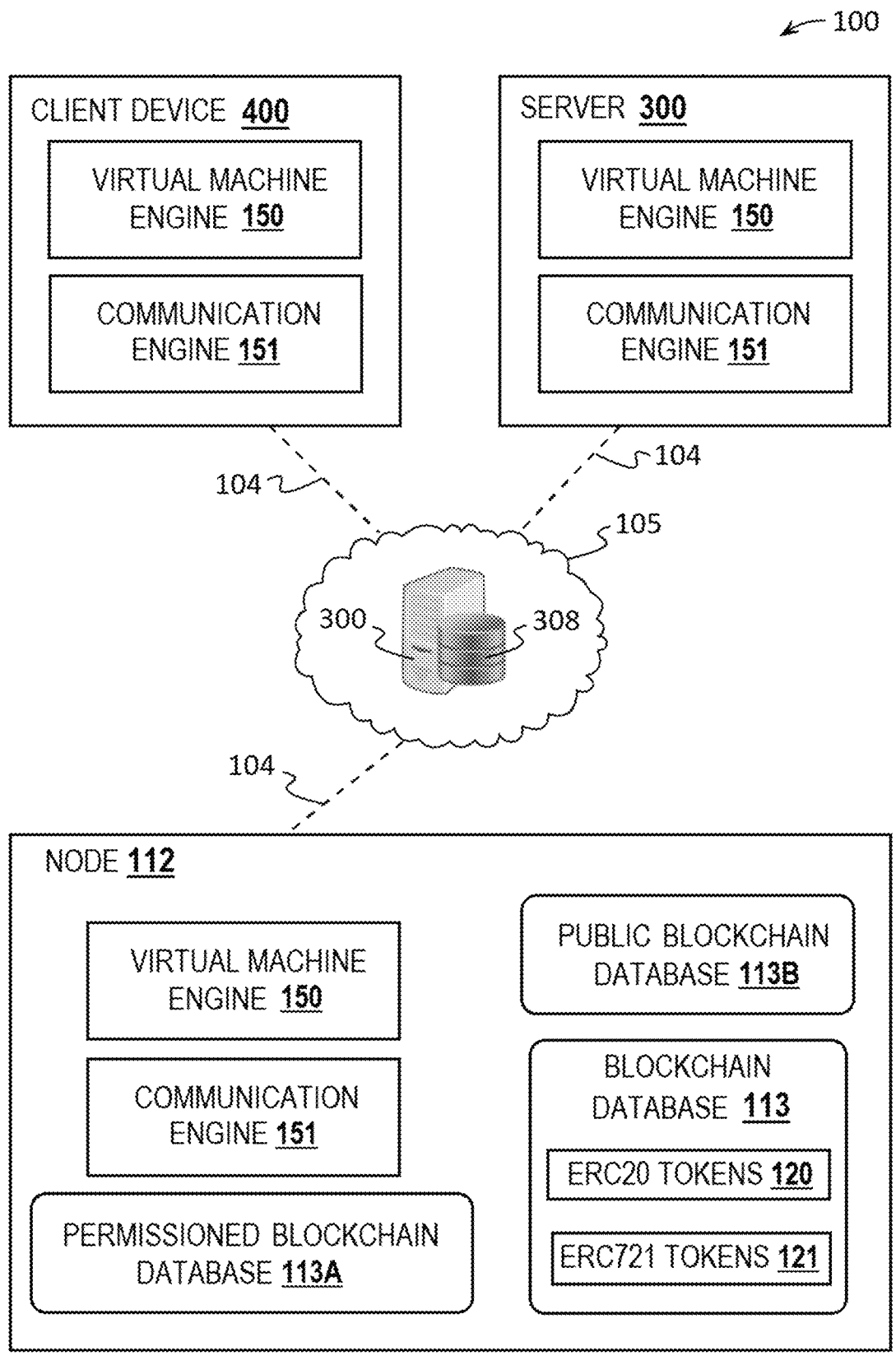
FIG. 4 depicts a block diagram illustrating some applications of an integrated supply platform system which may function as software rules engines according to various embodiments described herein.

Referring now to FIG. 4, a block diagram showing some software rules engines which may be found in a system 100 (FIG. 1) and which may optionally be configured to run on a server 300 (FIGS. 1 and 2) and/or a client device 400 (FIGS. 1 and 3) according to various embodiments described herein are illustrated. The server 300 and client device 400 may be in wired and/or wireless electronic communication through a network 105 with a data store 308 comprising a database, such as a system database 200. The engines 150, 151, may read, write, or otherwise access data in one or more databases of the data store 308. Additionally, the engines 150, 151, may be in electronic communication so that data may be readily exchanged between the engines 150, 151.

The system 100 may comprise a blockchain network 111 comprising one or more nodes 112 in which one or more servers 300 and/or client devices 400 may function as or comprise one or more of the nodes 112. Each node 112 of the blockchain network 111 may maintain a blockchain database 113 which may comprise a distributed ledger of the blockchain network 111. One or more of the engines 150, 151, may read, write, or otherwise access data in the blockchain database(s) 113 of the system 100. The system 100 may comprise one or more blockchain databases 113. In some embodiments, a blockchain database 113 of the system 100 may comprise a permissioned blockchain database 113A. In further embodiments, a blockchain database 113 of the system 100 may comprise a public blockchain database 113B. A plurality of tokens may be maintained in the one or more blockchain databases 113, and the tokens may include ERC20 tokens 120 and ERC721 tokens 121.

In this and some embodiments, one or more servers 300 and/or client devices 400 may be configured to run one or more software rules engines or programs such as a virtual machine engine 150 and a communication engine 151. The one or more virtual machine engines 150 and communication engines 151 of the system 100 may be configured to run on one or more client devices 400 and/or servers 300 with data transferred to and from one or more servers 300 in communication with a data store 308 through a network 105. It should be understood that the functions attributed to the engines 150, 151, described herein are exemplary in nature, and that in alternative embodiments, any function attributed to any engine 150, 151, may be performed by one or more other engines 150, 151, or any other suitable processor logic.

A virtual machine engine 150 may comprise or function as virtual machine logic stored in memory 310, 410 which may be executable by the processor 302, 402, of a server 300 and/or client device 400. Preferably, each node 112 may comprise a virtual machine engine 150, and the virtual machine engine 150 may manage and perform data transactions on the blockchain database 113 of the node 112. Generally, a virtual machine engine 150 may be run by a processor 302, 402, of a node 112, and may maintain a distributed ledger (copy of the blockchain database 113) on its memory 310, 410, and may thus synchronize transaction data with other nodes 112 containing the distributed ledger in order to implement a block chain based transaction processing system 100. In preferred embodiments, a virtual machine engine 150 may be configured to incorporate the data of one or more smart contracts 130 into a blockchain database 113 of the system 100. In further embodiments, a blockchain database 113 of the system 100 may comprise a permissioned blockchain database 113A, and the virtual machine logic 150 may be configured to perform a cryptographic hash function on the data of a smart contract 130 that is incorporated into the permissioned blockchain database 113A. In still further embodiments, a blockchain database 113 of the system 100 may comprise a permissioned blockchain database 113A, and the virtual machine logic 150 may be configured to encrypt the data of a smart contract 130 that is incorporated into the permissioned blockchain database 113A.

A communication application 151 may comprise or function as communication logic stored in memory 310, 410 which may be executable by the processor 302, 402, of a server 300 and/or client device 400. Preferably, communication applications 151 may be configured to govern electronic communication between nodes, 112, severs 300, and client devices 400. In some embodiments, a communication application 151 may comprise or function as input logic stored in the memory 310, 410, which may be executable by the processor 302, 402, of a server 300 and/or client device 400. In some embodiments, communication logic of a client device may be configured to communicate data of a smart contract 130 between the client device 400 and a blockchain database 113 via one or more nodes 112 and servers 300.

The communication application 151 may generate a decentralized application (dApp) 152 on a client device 400 of a user 101, and the dApp 152 may receive input from the user 101 and display output to the user 101, preferably through an I/O interface 304, 404, and the input may comprise information for enabling the user 101 to manipulate data of the system 100, such as the data associated with one or more smart contracts 130 of the system 100.

In preferred embodiments, the system 100 may be configured primarily as a business-to-business (B2B) platform in a manner similar to popular wholesale-to-retail online markets. The system 100 may include a native cryptocurrency or token, such as ERC721 tokens 121, which may be used for purchasing memberships for business accounts and regular membership.

In some embodiments of the system 100, vendor accounts may require different types of bonds in line with different permitted levels of transactions and business interactions. In preferred embodiments, the system 100 may be configured to enable transactions to be "insured" by collecting a percentage of transactions and directing them to a pool that indemnifies purchases and transactions, as well as merchandise if a user 101 decides to pay a fee for the insurance of their transaction. For example, this insurance may be used to cover bottle breakage, lost or damage goods or services, malpractice, an many more common industry mishaps. By utilizing a blockchain database 113 for storage of system data, the system 100 may enable transparency and ledger technology that provide every company 101A, 101B, or user 101, 101C, with the ability to do business securely and track and trace the data involved using smart contracts and blockchain validation. Additionally, the system 100 provides these companies 101A, 101B, and users 101, 101C, the ability to exchange, view, notarize, register, validate and approve data regarding contracts, purchases, tracking and tracing of products and materials, identification of products, letters of intention, certificates of origin, purchase orders, deliveries and payments.

In some embodiments, the system 100 may include a Token Generation Event (TGE) or campaign in an initial step toward launching of the system 100. Preferably, the Token Generation Event (TGE) stage may deploy ERC20 tokens 120 on Ethereum Mainnet. ERC20 is a very popular token standard and is easily accepted by crypto exchanges. Every individual or entity who becomes an initial token holder may go through "Know Your Customer"/Anti-Money Laundering procedures (KYC/AML) and after successful completion will be able to contribute to the system 100 as a user 101. At the moment when the system 100 receives contributions, a smart contract automatically deploys ERC20 tokens 120 to the user's 101 wallet based on the exchange rate.

Figure 5:
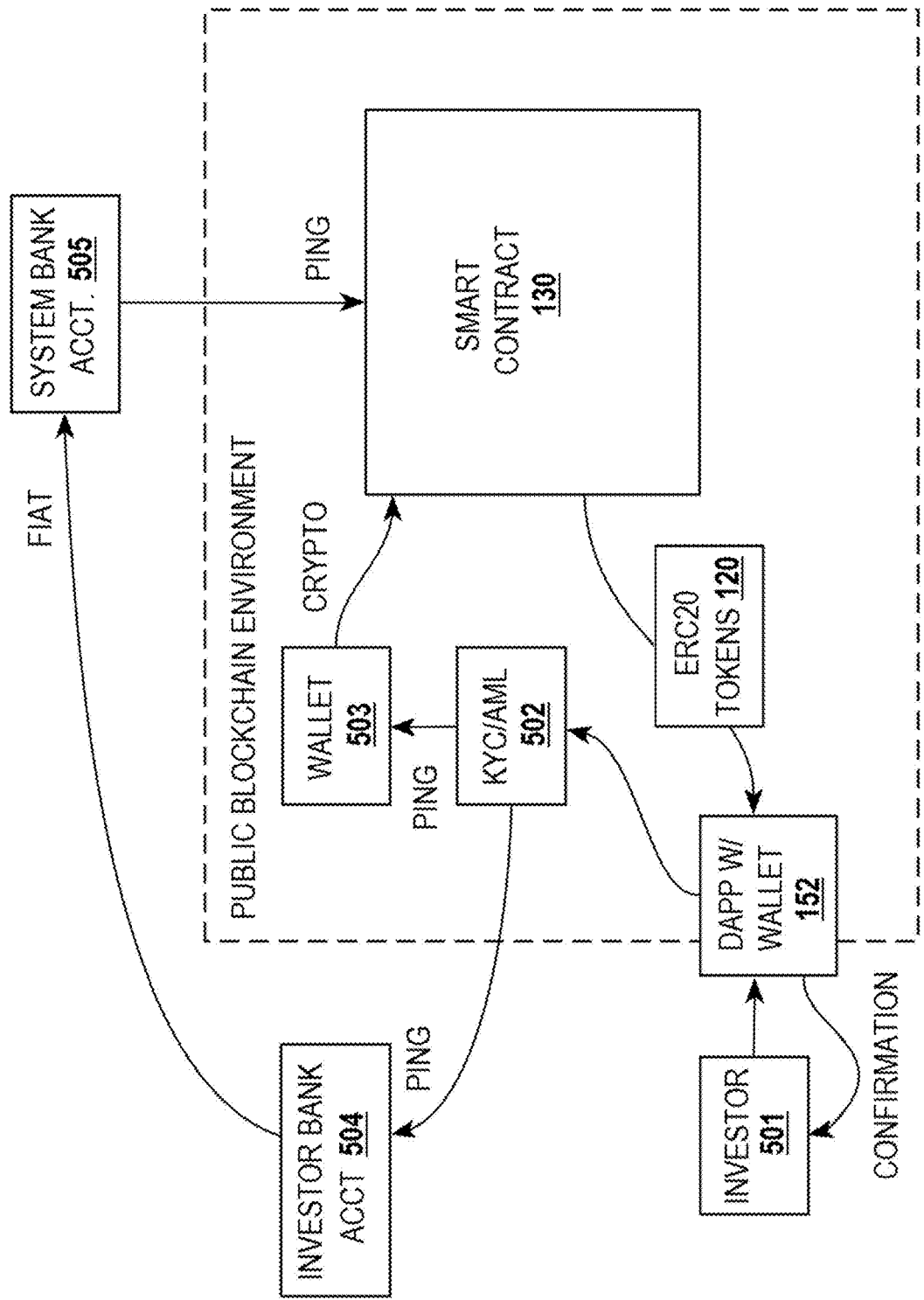
FIG. 5 illustrates a block diagram of an example token sale architecture of an integrated supply platform system according to various embodiments described herein.

FIG. 5 depicts a block diagram of an example token sale architecture of the system 100 according to various embodiments. In some embodiments, an investor 501 enters the the TGE Cabinet of the system 100 and may undergo KYC/AML procedures 502. After KYC/AML verification, he becomes a user 101 and is able to contribute to the system 100 by using both fiat and cryptocurrency or crypto.

If user 101 chooses crypto, he pings his wallet 503 to send cryptocurrency coins to the to the system 100. If the user 101 chooses fiat, he pings his bank account 504 to send fiat (bank wire or/and bank card) to the system bank account 505. The system bank account 505 may ping a smart contract 130 regarding funds receiving. The virtual machine engine 150 may refer to the smart contract 130 to mint ERC20 tokens 120 in the amount which is equal to the amount of the user's 101 contribution based on exchange rate and the ERC20 tokens 120 are provided to the user's 101 wallet 503 which may be accessed via a dApp 152. After that, the user 101 is able to use ERC20 tokens 120 for trading, peer-to-peer (p2p) transactions, and as an access to the system 100.

Figure 6:
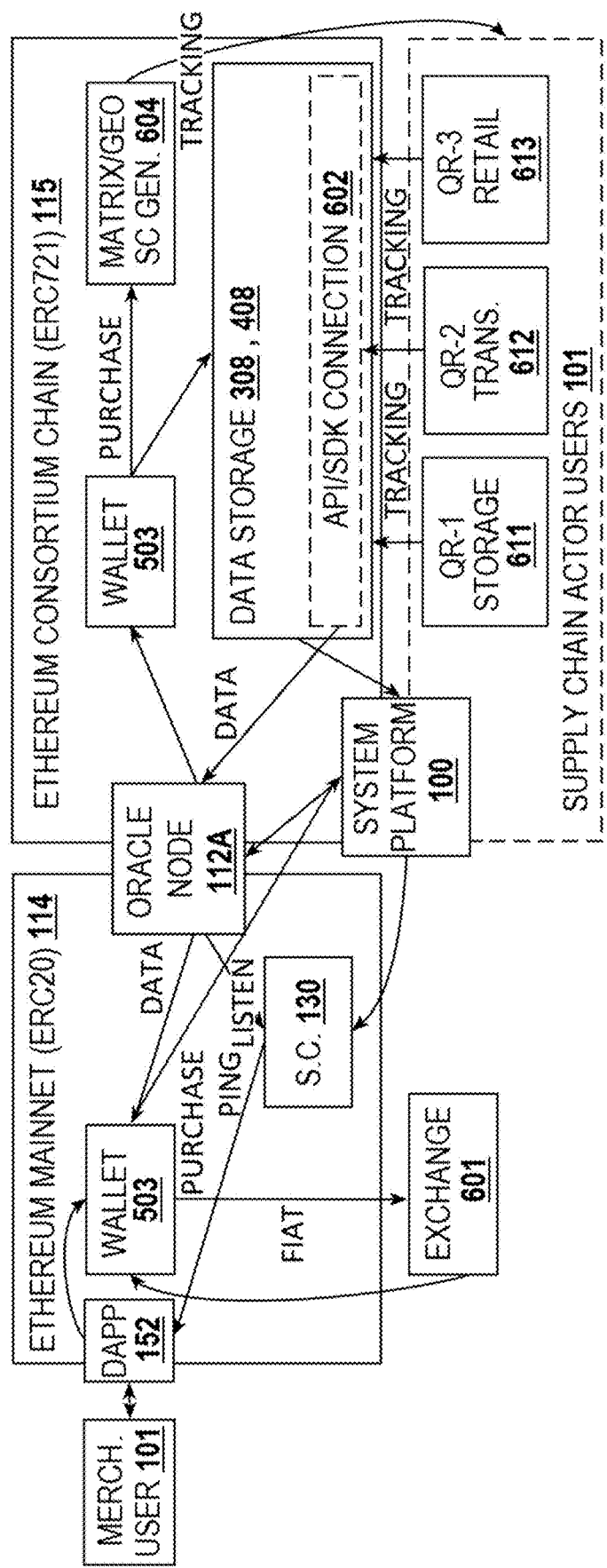
FIG. 6 shows a block diagram of an example hybrid system operational workflow of an integrated supply platform system according to various embodiments described herein.

FIG. 6 illustrates a block diagram of an example hybrid system operational workflow of the system 100 according to various embodiments. After the token generation event, ERC20 tokens 120 of the system 100 may be used to access the system 100 that has been developed for a smooth transition.

After the consortium chain grows to sufficient amount (such as 1,000 tps for a network of 10,000-20,000 active users), it will be derived from computational power provided by client devices 400 of users 101. Preferably, start nodes 112 will be backed with Cloud virtual machines (VMs).

A merchant user 101 may use the dApp 152 to purchase ERC20 tokens 120 according to the current exchange 601 which may then be deposited in the wallet 503A of the merchant user 101. Optionally, smart contracts 130 in Ethereum Mainnet 114 may include only input addresses of system tokens 120, 121, and output addresses according to the agreement on Gas fees. Preferably, between input and output addresses there may be oraclization via an oracle node 112A. In some embodiments, a system Oracle node 112A will start to exchange ERC20 tokens 120 from Mainnet 114 to ERC721 tokens 121 inside the consortium chain 115.

The system 100 may avoid speed limitations of Ethereum and decline the Gas price as it may be calculated differently (time of SC exceeding average transaction execution in seconds multiplied by the average transaction fees/average transaction per second).

By building the system 100 on top of Ethereum Mainnet will entail operational costs and time-lags as transaction speed is limited by 20-25 transactions per second which is a huge problem for users. In preferred embodiments, the system 100 may be configured as a hybrid system establishing the system 100 platform on Ethereum Mainnet (public chain) with computation power on the sidechain of Ethereum codenamed, Ethereum Consortium Chain provides an optimal solution.

When a user 101 concludes an agreement/deal (smart contract), they receive an appropriate ERC721 token 121, which may be minted by a virtual machine engine 150 using a smart contract that stores all information needed as proof for the system 100.

Data may also be stored in an external data storage 601 infrastructure of the system and the hash-data may be stored on a blockchain database 113, namely in a system 100 smart contract using SHA-256 for data encryption which turns certain fixed-length values into a random dataset that serve as an identifier for the data to validate and sign digital security certificates and documents. The obtained value, like duplicate source data, cannot be extracted. It means it will be impossible to change or delete data from the blockchain database 113 and for unauthorized entities to read data from the blockchain database 113.

In preferred embodiments, merchant users 101 may purchase smart contracts 130 which may be generated with a matrix code and/or geo-waypoint data 604 so that the smart contract 130 comprises one or more matrix codes and/or geo-waypoint data. A matrix code may comprise any optical, machine-readable, representation of data which may be optically recorded by a client device 400, such as via an input/output (I/O) interface 404 configured as a camera. A matrix code, sometimes called a 2D barcode or simply a 2D code, is a two-dimensional way to represent information. It is similar to a linear (1-dimensional) barcode, but can represent more data per unit area. Exemplary matrix codes include Aztec Code, CrontoSign, Data Matrix, DotCode, EZcode, High Capacity Color Barcode, Han Xin Barcode, MaxiCode, NexCode, Qode, QR code, AR Code, ShotCode, and SPARQCode although any other type of 2D barcode may be used.

In some embodiments, each ERC721 token 121 may also store geo-waypoint data, and more preferably all geo-waypoint data, in it. So both Consumer users 101 and Customer users 101 have equal access to all the information regarding a deal. Geo-waypoint data may comprise location data, such as geolocation coordinates, addresses, or any other data which may be used to determine the location of an object that may be associated with an ERC721 token 121 and/or smart contract 130. Data may be stored in one or more data stores 308, 408, of the system 100 and an API/SDK connection 602 may be used for the tracking of storage type QR codes 611, transport type QR codes 612, retail type QR codes 613, and any other type of QR code or the like, by one or more supply chain actor users 101.

In some embodiments, the system 100 may enable users 101 to insure their deals simply and automatically preferably by putting an appropriate checkmark in a smart contract 130. This insurance feature may be included in any appropriate smart contract, and the cost may be included in the transaction.

In preferred embodiments, for efficient tracking, consortium chain may have an unlimited supply of internal ERC721 tokens 121 that can be conveniently arranged with Docker in containers (by types of agreements).

Figure 7:
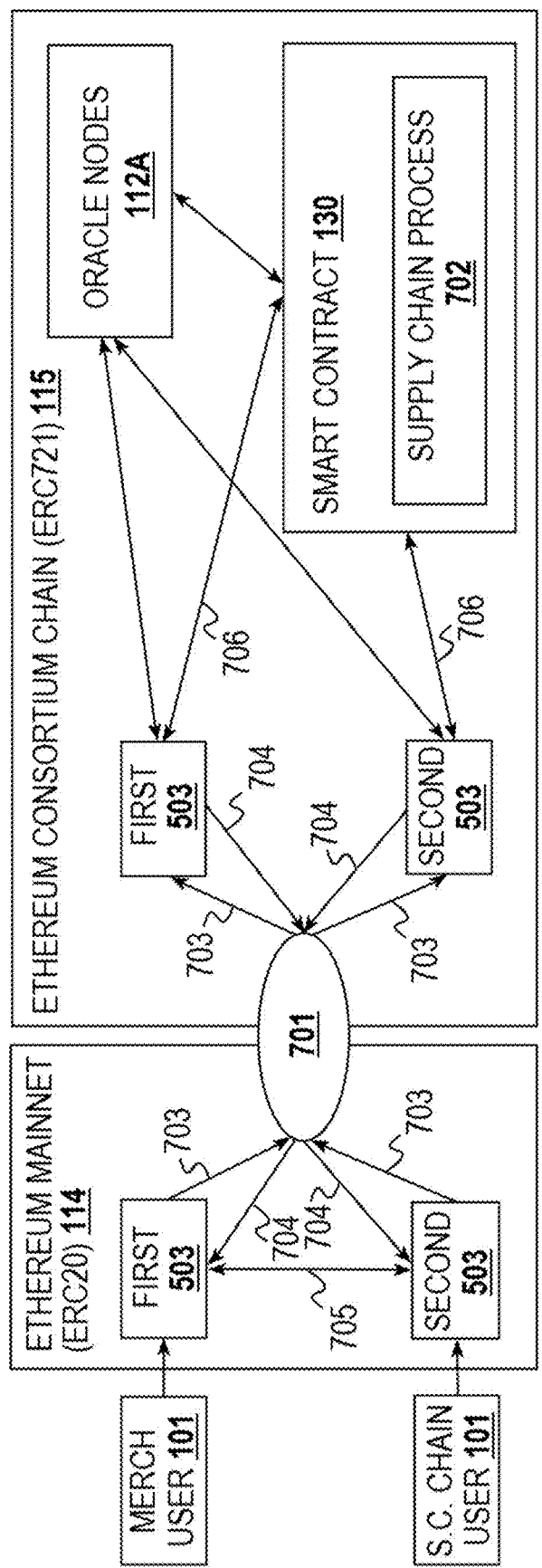
FIG. 7 depicts a block diagram of an example public and consortium chains communication architecture of an integrated supply platform system according to various embodiments described herein.

FIG. 7 shows a block diagram of an example public and consortium chains communication architecture according to various embodiments described herein. The architecture may be used by a user 101 to send stake to a system wallet 503C and make transactions within the system 100 with tokens 120, 121. The system wallet 503C may release public tokens in the amount of their balance within the user's wallet 503 of the system 100.

In some embodiments, users 101, such as merchant users 101 and supply chain actor users 101 may interact through DApps 152 (preferably having wallets 503) with the system 100 but optionally may deal only with an ERC20 token 120 on the public network. Users 101 may freely transact public tokens 120, 121, between each other on Ethereum Mainnet with Gas fees payable by them. Users 101 can also exchange public tokens 120, 121, on exchanges that are listing them with the same transaction fees in Gas. In some embodiments, Oracle nodes 112A allow uploading of platform data in the quazi-blockchain environment where off-chain operations may be actively monitored with consortium chain for events related to token 120, 121, transfer, while all other activity may be fully centralized and off-chain operated. In preferred embodiments, automated exchange may be performed by a virtual machine engine 150 via looking in outside blockchain system(s) to see market prices.

In some embodiments, a DApp 152 may be utilized by each user 101 of the system 100 via a client device 400 of the user 101, which may be connected with off-chain data and allows users 101 to perform activities within a described solution. Users 101 may use ERC721 consortium tokens for operation with smart contracts 130 to perform one or more supply chain processes 702. The DApps 152 of the system 100 may communicate with off-chain data through the Oracle node (or nodes) 112A, as this preferably may be the only way to provide the required data to them. Communication may include input balance communication 703, output balance communication 704, ERC20 public token flow communication 705, ERC721 consortium token flow communication 706, etc. In further embodiments, a gateway 701 may listen to consortium chain wallets 503 and collect data about current account balances of ERC721 consortium chain tokens. Input balance communication 703 and output balance communication 704 between wallets 503 may be provided via a gateway 701 between the ethereum mainnet 114 and ethereum consortium chain 115. If a user 101 accepts a transaction, the wallet 503 releases an ERC20 public token that equals the value of the public tradable tokens.

In some embodiments, the front-end of the system 100 may comprise Java (Jdk1.8.xare1.8.x open source Java libraries and Java script for UI libraries to design the front-end components) or any other suitable alternative.

In some embodiments, the front-end of off-chain elements may comprise Java (Java script for UI libraries to design the front-end components), Django (administration of front-end), Web3.js (communication with Ethereum blockchain and smart contracts), or any other suitable alternative.

In some embodiments, one or more databases may comprise MongoDB/RocksDB, Apache Kafka (databases and other systems communication), or any other suitable alternative.

In some embodiments, portfolio storage may comprise MongoDB/RocksDB (databases management), Apache Kafka (databases and other systems communication), or any other suitable alternative.

In some embodiments, back-end of off-chain elements may comprise Spring (support development stack at each level whether security, messaging, data handling), Hibernate (ORM tool to map java classes to Database tables), or any other suitable alternative.

In some embodiments, communication with 3rd party providers system may comprise RESTful API, Docker) or any other suitable alternative.

In preferred embodiments, every communication channel that is used within the system 100 (between nodes 112, data storage, users' dApps 152, etc.) may be encrypted and secured by SSL/TLS certificates that allows the establishment of fully encrypted channels on the on/off-chain infrastructure.

Figure 8:
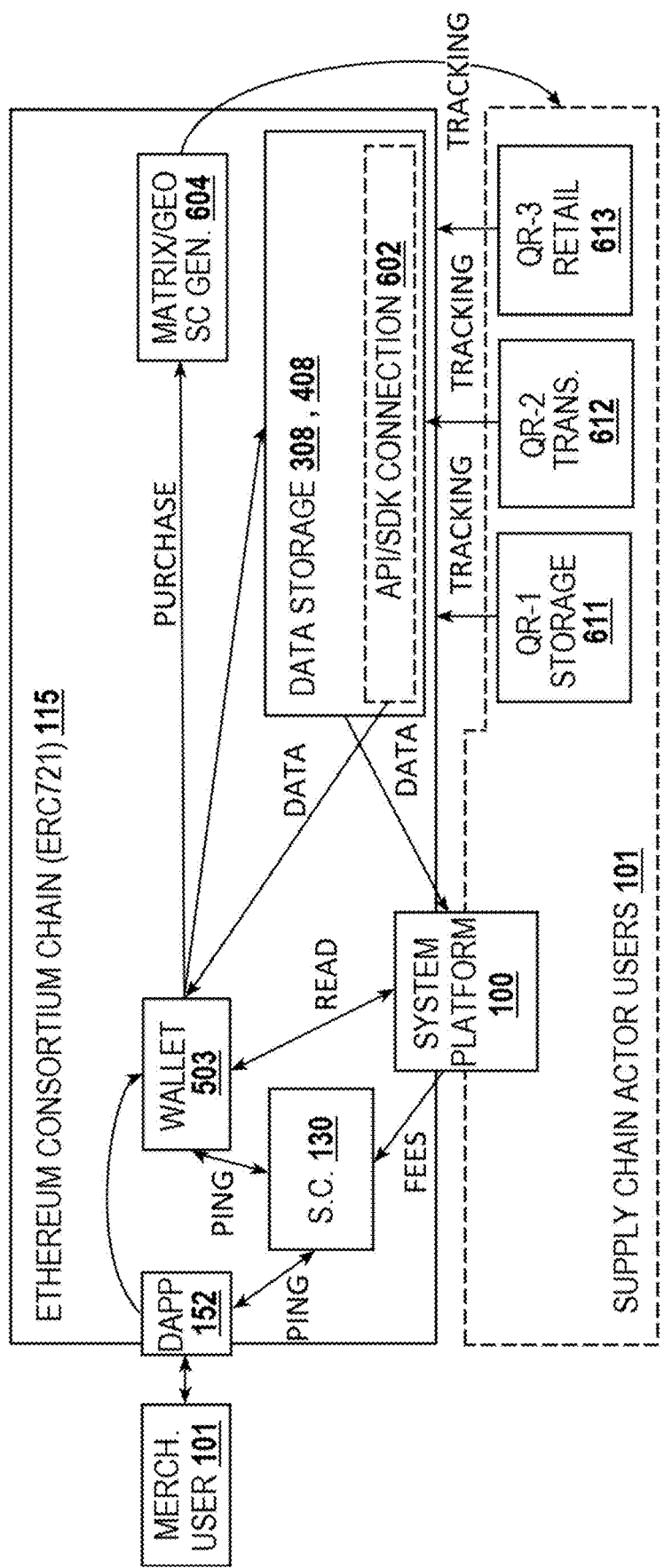
FIG. 8 illustrates a block diagram of an example of a consortium chain architecture of an integrated supply platform system according to various embodiments described herein.

FIG. 8 shows a block diagram of an example of a consortium chain architecture of the system 100 according to various embodiments described herein. In some embodiments, at this stage, the system 100 may execute a full migration to being a permissioned system 100 with a gradual extension with new nodes 112 and transformation to the public chain ethereum consortium chain 115. This will enable users 101 to communicate with the system 100 via their client device 400 using consortium chain 115 directly. It will also increase transaction speed and decrease operational costs and there will be no need to communicate with the external environment. In preferred embodiments, the system 100 may comprise a permissioned blockchain database 113A (a blockchain data base 113 that requires a user 101 to have one or more permissions in order to view some or all information within that blockchain data base 113) and a public blockchain database 113B (a blockchain data base 113 that does not require a user 101 to have one or more permissions in order to view some or all information within that blockchain data base 113).

The system 100 may comprise any number, such as a plurality, of ERC20 public ethereum tokens 120 which may comprise ERC20 tokens on public Ethereum Mainnet 114 which may be used for many purposes, including the following purposes: public TGEs for fundraising, listings on public exchanges, direct transactions between users 101 outside the system 100, access to the system 100, access to rewards and bonuses systems of the system 100. In some embodiments, key features of token economics may include: initial distribution of token with TGE, implemented inflation in according to target market growth, and token price reduction with fees payable in an ETH.

The system 100 may comprise any number, such as a plurality, of ERC721 ethereum consortium chain tokens 121 which may comprise ERC721 tokens on private Ethereum Chain which may be used for many purposes, including the following purposes: storing event data collected via APIs during supply chain process, storing geo-data collected by SDK devices, and storing client and customer order data. Key features of token economics may include: no fees (except Gas) for running ERC721 tokens on internal platform environment of the system 100, and unlimited supply of ERC721 tokens on Ethereum Consortium chain used for platform's internal purposes. This type of token does incur Gas fees but the system 100 will have no fees for transaction execution as it is allowed by Ethereum Consortium Chain as one of its main features.

In preferred embodiments, the Consortium chain of the system 100 will be able to deploy as many ERC721 tokens 121 as needed for each supply chain order. This operation may be free as well. When an ERC721 token 121 goes from the A to Z supply chain process, there will be an opportunity to burn the token as it will not be needed (in some embodiments, burning can be done by erasing metadata in the ERC721 token 121 and then assigning its account number to the last minted ERC721 token).

Figure 9:
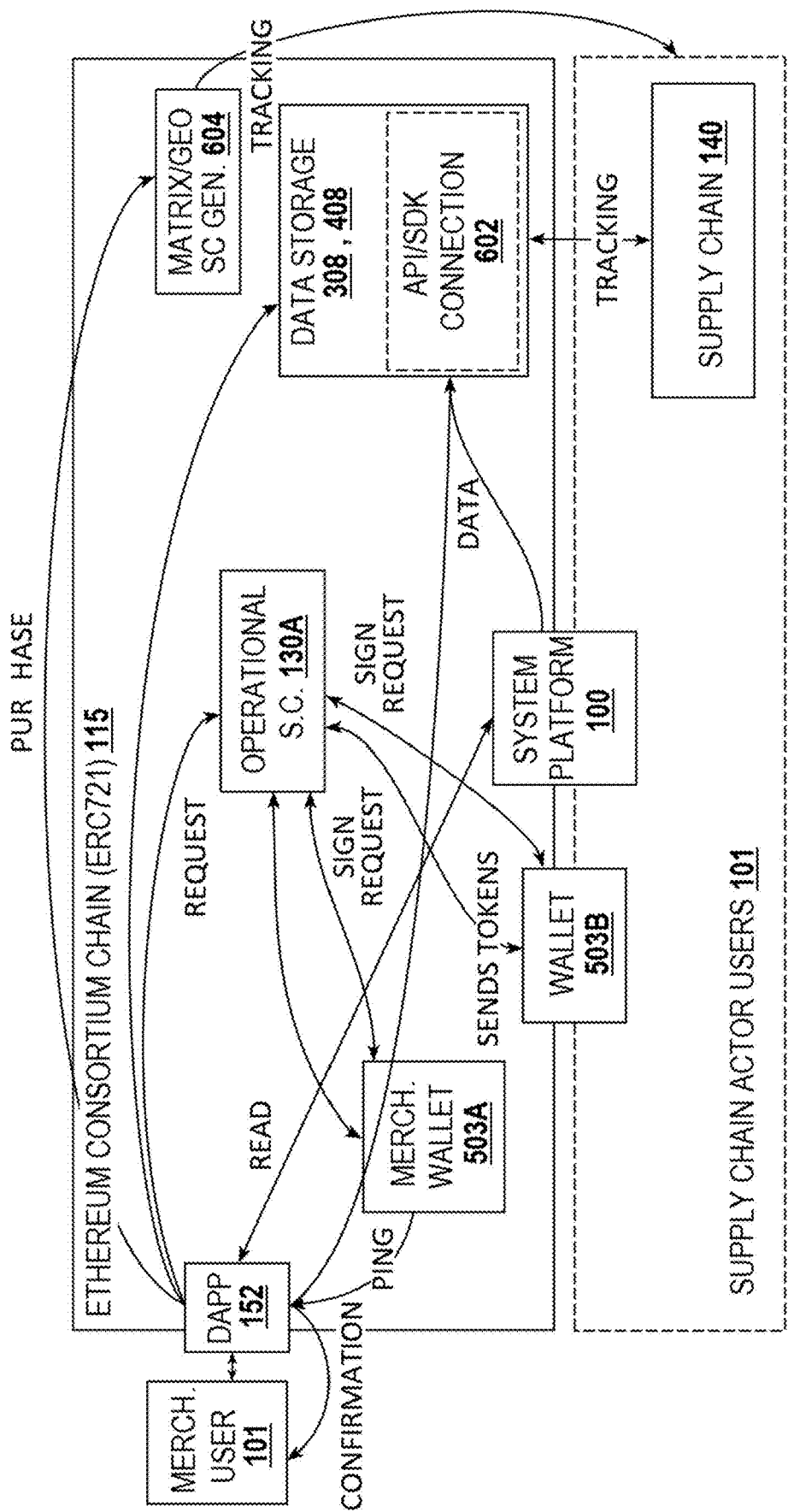
FIG. 9 shows a block diagram of an example of a smart contract workflow of an integrated supply platform system according to various embodiments described herein.

FIG. 9 illustrates a block diagram of an example of a smart contract 130 workflow of the system 100 according to various embodiments described herein. The system 100 may enable one or operational more smart contracts 130 to be formed by and between one or more users 101. In this example, a merchant user 101 sends the request for purchase and the operational smart contract 130A receives the request. The operational smart contract 130A sends the request to the Merchant wallet 503A to verify that it has enough ERC20 tokens 120 for the transaction. If the operational smart contract 130A receives confirmation regarding the availability of funds, the operational smart contract 130A sends a confirmation request to the user 101 who wants to make an order and the merchant user 101 signs the transaction. The operational smart contract 130A starts the supply chain process. When the order is completed, operational smart contract 130A may then collect a number of required signatures from users 101 regarding this order, such as two out of three signatures. The operational smart contract 130A may then send reward tokens 120, 121, for this order to the supply chain actors 101 wallet 503B. Then the operational smart contract 130A may ping merchant, via their client device 400, about successful execution of the transaction.

In preferred embodiments, a smart contract 130 in the permissioned environment and permissioned blockchain database 113A of the system 100 may be created for the user 101 automatically with an event on Mainnet (smart contract 130 deployment). This feature may be assured by Oracle node 112A preferably connected to Etherscan via API and will listen to system 100 token flow. A smart contract 130 in permissioned blockchain database 113A may handle all other arrangements (QR-codes, geo-waypoints, SLA, other supplements that depend on available libraries of smart contracts 130. The API may allow providing data on smart contract 130 events to the permissioned blockchain database 113A.

In further embodiments, the operational smart contracts 130A of the system 100 may also provide an Escrow feature. Preferably, after all arrangements are executed, distribution of tokens 120, 121, may be a result of the permissioned smart contract 130. In some embodiments, the virtual machine engine 150 may send the operational smart contract 130A to a public blockchain database 113 through an Oracle node 112A, and the virtual machine engine 150 distributes to the output addresses.

In preferred embodiments, the payment system may include a system 100 escrow service and the smart contract 130 with timestamp. Under Escrow services, a smart contract 130 in public blockchain database 113 may be created as multi-signature smart contract 130 that preferably requires a number of signatures, such as two of three signatures (e.g. sender or receiver AND system escrow) to be completed. Preferably, escrow may only be required in case of disputes that arise between a user 101 or portfolio company 101B of the system 100.

In preferred embodiments, operational smart contract 130A of the system 100 also provide smart contracts 130 with timestamps, meaning that a smart contract 130 is published but not mined until the time indicated in the smart contract 130. When the time comes, the smart contracts 130 pings an Oracle node 112A and if there is no result, the transaction is dismissed or included in the next payment.

In some embodiments, if there are several levels of payments (penalties for delays), Gas fees will be much higher but the option will be still available.

Figure 10:
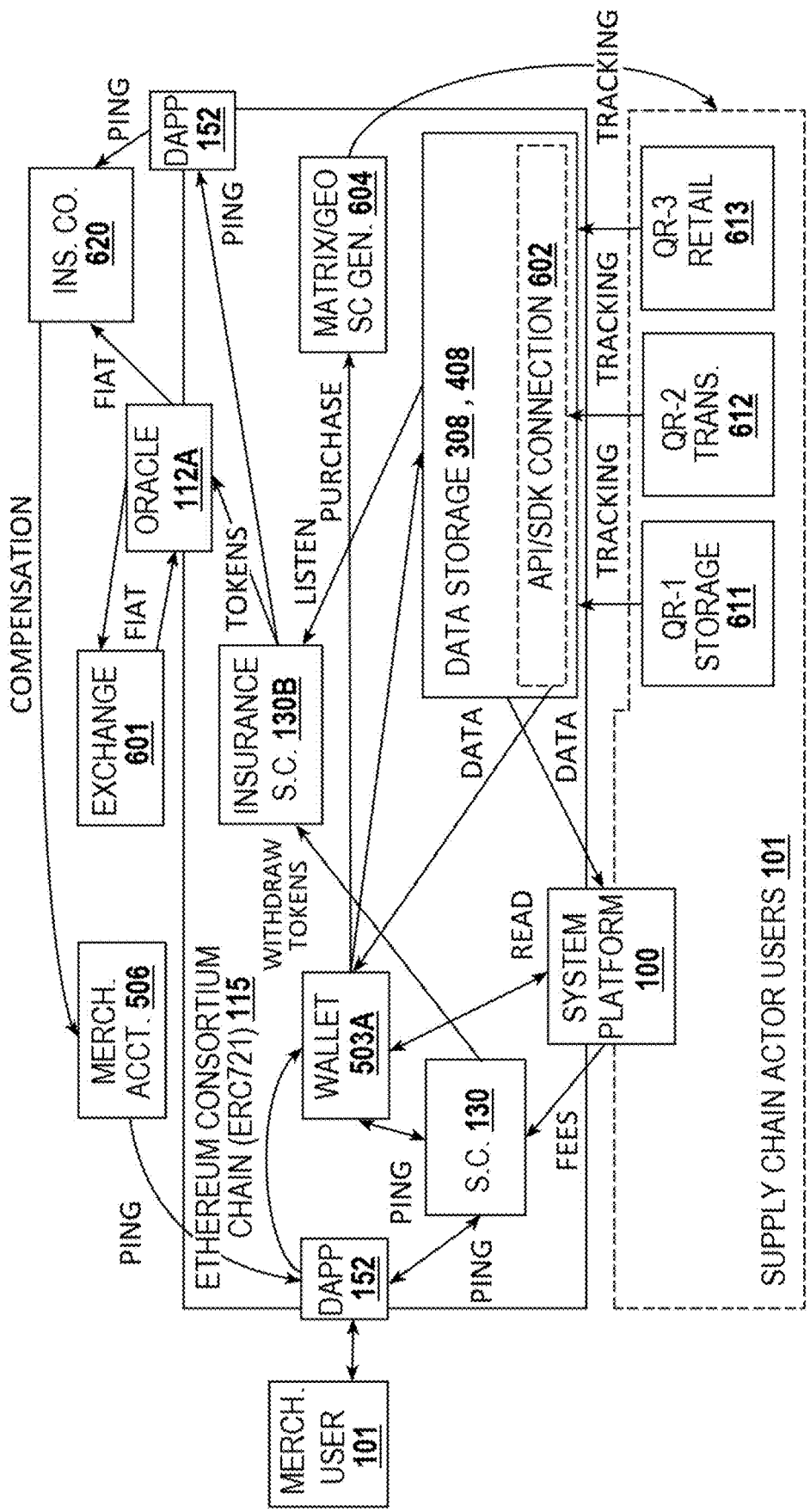
FIG. 10 depicts a block diagram of an example of a workflow for insuring a smart contract of an integrated supply platform system according to various embodiments described herein.

FIG. 10 depicts a block diagram of an example of a workflow for insuring a smart contract 130 of the system 100 according to various embodiments described herein. In some embodiments, the system 100 may enable its users 101 the ability to automatically insure their deals. For example, when a merchant user 101 selects to insure a deal, the smart contract 130 for the deal may automatically include an insurance fee into the payment. This insurance smart contract 130B will withdraw tokens 120, 121, based on the insurance agreement and may change them to fiat currency to be sent to the underwriting insurance company. This feature will be available for ERC20 tokens 120 as well.

In preferred embodiments, any user 101 of the system 100 may include insurance services in a deal that they are a participant of. When an operational smart contract 130A receives tokens 120, 121, for a deal, the insurance smart contract 130B deducts tokens 120, 121, for the insurance service. The insurance smart contract 130B may then send the tokens 120, 121, to the exchange via an Oracle node 112A. When a system 100 bank account receives fiat currency, it may be sent to the insurance company's bank account. Preferably, the insurance smart contract 130B constantly listens to data storage 308, 408, of the system 100, and if an accident occurs, the insurance smart contract 130B will ping the insurance company 620 via their dApp 152. When Insurance company 620 verifies claim, compensation may be sent to the merchant's bank account 506.

In further embodiments, the system 100 may enable an automatic process of tracking the supply chain 140 with an insurance smart contract 130B. When a deal starts, an insurance smart contract 130B preferably starts tracking data storage 308, 408, of the system 100 through the listen function. When an accident or other covered event occurs, the insurance smart contract 130B pings the insurance company 620 for compensation via the insurance company's dApp 152. When the insurer 620 verifies the accident, it preferably sends compensation to the merchant bank account 506 automatically without involving intermediaries. This keeps the system 100 secure and independent.

Figure 11:
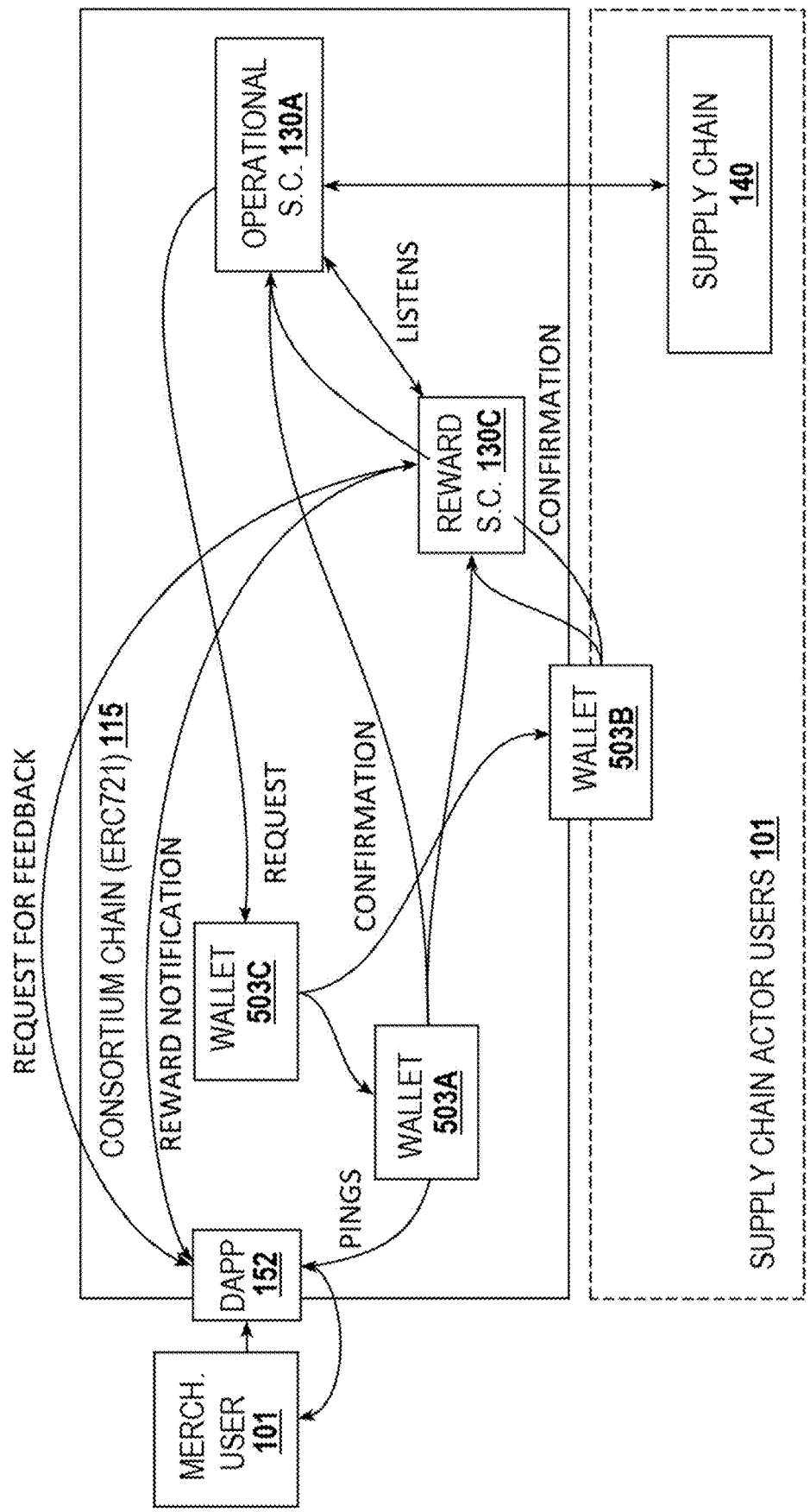
FIG. 11 illustrates a block diagram of an example of a workflow for a reward smart contract of an integrated supply platform system according to various embodiments described herein.

FIG. 11 shows a block diagram of an example of a workflow for a reward smart contract 130C of the system 100 according to various embodiments described herein. To incentivize new users 101 to the system 100 and to keep the utilization of ERC20 public tokens 120 at a high level, the system 100 may include the ability to generate one or more reward smart contracts 130C that will encourage use of the system 100 and its tokens 120, 121.

In some embodiments, a merchant user 101 may connect to the system 100 via a dApp 152 running on their client device 400. A reward smart contract 130C may listen to a operational smart contract 130A on the subject of how many interactions with the system 100 were performed by the merchant user 101. In preferred embodiments, a reward smart contract 130C may provide one or more ERC20 tokens 120 to a wallet 503 of a user 101 when the user 101 performs a number of interactions with the system 100. Based on predefined conditions in the reward smart contract 130C, the reward smart contract 130C sends requests to the operational smart contract 130A. The operational smart contract 130A may send a request for the reward to a system wallet 503C (rewards may include ERC20 tokens 120, subscription discounts, etc.). The system wallet 503C may send ERC20 tokens 120 as a reward to the merchant's wallet 503A. Preferably, the merchant user 101 may receive a notification of the rewards (such as a notification describing the received tokens 120) from the system 100 via User's dApp 152 running on their client device 400.

In some embodiments, all rewards and bonuses may be executed automatically and independently by reward smart contracts 130C hosted on Ethereum Consortium net. This enables the reward system of the system 100 to provide more transparency and credibility to users 101 as the conditions will be open to the public as well as the code of the reward smart contracts 130C.

Any number of activities performed on the system 100 may be rewarded. In some embodiments operational activities may be rewarded, and the rewards may be realized when the user 101 executes a certain number, for example 3 or more, deals on the system 100. The reward smart contract 130C may check those transactions and based on them remunerate the merchant user 101, such as by AirDrop of additionals ERC20 tokens 120. In some embodiments, providing ratings to the system 100 may be rewarded. Preferably, after each iteration, the reward smart contract 130C may ask the Merchant/Customer user 101 for feedback and when they receive a positive rating, the reward smart contract 130C may reward the Merchant/Customer user 101. In some embodiments, referring one or more individuals to the system 100 may be rewarded. For example, when a deal is successfully executed on the system 100, users 101 will be able to share this information on social media by attaching a referral link. When a new merchant uses that referral link for signing up to the system 100 to become a user 101, the referral link holder user 101 may be remunerated.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), light emitting diode (LED) display, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD), light emitting diode (LED) display, or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An integrated supply platform system, the system comprising:
   a blockchain database maintained by a blockchain network, the blockchain network comprising a plurality of nodes;
   a plurality of tokens maintained in the blockchain database;
   a smart contract describing a deal between a first user and a second user, the smart contract configured to transfer at least one token between the first and second users upon completion of the deal, wherein the smart contract is an operational smart connect, wherein the operational smart contract starts a supply chain process for completion of the deal between the first user and second user, wherein upon completion of the deal, the operational smart contract collects at least one required signature from the first user and second user, and wherein the operational smart contract sends at least one reward token for this deal to a wallet of a supply chain actor,
   a client device having a memory and a processor, the client device having a communication logic stored in the memory of the client device, the communication logic executed by the processor of the client device and configured to communicate data of the smart contract between the client device and the blockchain database; and
   at least one node of the blockchain network having a memory and a processor, the at least one node having a virtual machine logic stored in the memory of the at least one node of the blockchain network, the virtual machine logic executed by the processor of the at least one node of the blockchain network and configured to incorporate the data of the smart contract into the blockchain database.

2. The system of claim 1, wherein the blockchain database is a permissioned blockchain database, and wherein the virtual machine logic is configured to perform a cryptographic hash function on the data of the smart contract that is incorporated into the permissioned blockchain database.

3. The system of claim 1, wherein the blockchain database is a permissioned blockchain database, and wherein the virtual machine logic is configured to encrypt the data of the smart contract that is incorporated into the permissioned blockchain database.

4. The system of claim 1, wherein the smart contract comprises a matrix code.

5. The system of claim 1, wherein plurality of tokens comprises at least one Ethereum request for connect standard 721 (ERC721) token.

6. The system of claim 5, wherein the at least one Ethereum request for comment standard 721 (ERC721) token comprises geo-waypoint data.

7. The system of claim 1, wherein plurality of tokens comprises at least one Ethereum request for comment standard 20 (ERC20) token.

8. The system of claim 1, further comprising an oracle node, wherein the oracle node is configured to exchange an Ethereum request for comment standard 20 (ERC20) token from Mainnet to an Ethereum request for comment standard 721 (ERC721) token inside a consortium chain of the blockchain database.

9. The system of claim 1, wherein the blockchain database is a public blockchain database, and wherein the smart contract is created in the public blockchain database as multi-signature smart contract that requires a number of signatures to be completed.

10. An integrated supply platform system, the system comprising:
    a blockchain database maintained by a blockchain network, the blockchain network comprising a plurality of nodes;
    a plurality of tokens maintained in the blockchain database, wherein the plurality of tokens comprises at least one Ethereum request for comment standard 721 (ERC721) token and at least one Ethereum request for comment standard 20 (ERC20 token;
    a smart contract describing a deal between a first user and a second user, the smart contract configured to transfer at least one system token between the first and second users upon completion of the deal, wherein the smart contract is an insurance smart contract that includes an insurance fee that is paid to an insurance company having a decentralized application, wherein the insurance smart contract constantly listens to a data storage of the system, and if data describing an accident occurs in the data storage of the system, the insurance smart contract will ping the insurance company with a claim via the decentralized application, and wherein compensation is sent to a bank account that is associated with the insurance smart contact when the insurance company verifies the claim;
    a client device having a memory and a processor, the client device having a communication logic stored in the memory of the client device, the communication logic executed by the processor of the client device and configured to communicate data of the smart contract between the client device and the blockchain database; and
    at least one node of the blockchain network having a memory and a processor, the at least one node having a virtual machine logic stored in the memory of the at least one node of the blockchain network, the virtual machine logic executed by the processor of the at least one node of the blockchain network and configured to incorporate the data of the smart contract into the blockchain database.

11. The system of claim 10, wherein the blockchain database is a permissioned blockchain database, and wherein the virtual machine logic is configured to perform a cryptographic hash function on the data of the smart contract that is incorporated into the permissioned blockchain database.

12. The system of claim 10, wherein the blockchain database is a permissioned blockchain database, and wherein the virtual machine logic is configured to encrypt the data of the smart contract that is incorporated into the permissioned blockchain database.

13. The system of claim 10, wherein the smart contract comprises a matrix code.

14. The system of claim 10, wherein the at least one Ethereum request for comment standard 721 (ERC721) token comprises geo-waypoint data.

15. The system of claim 10, further comprising an oracle node, wherein the oracle node is configured to exchange an Ethereum request for comment standard 20 (ERC20) token from Mainnet to an Ethereum request for comment standard 721 (ERC721) token inside a consortium chain of the blockchain database.

16. The system of claim 10, wherein the blockchain database is a public blockchain database, and wherein the smart contract is created in the public blockchain database as multi-signature smart contract that requires a number of signatures to be completed.

* * * * *